D. E. ZINN.
ELECTRIC SIGNAL.
APPLICATION FILED DEC. 19, 1910.
1,004,518.
Patented Sept. 26, 1911.
2 SHEETS—SHEET 2.
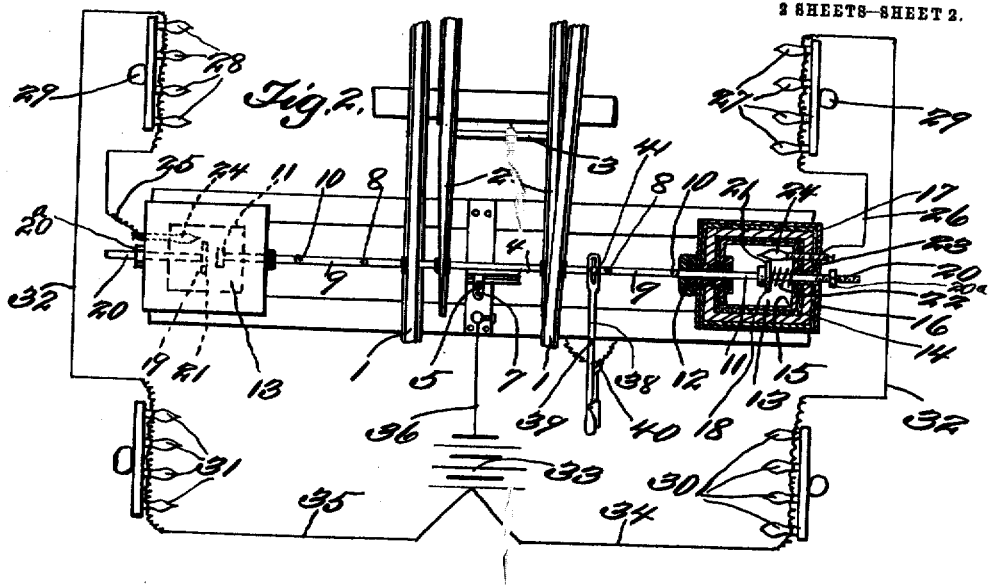
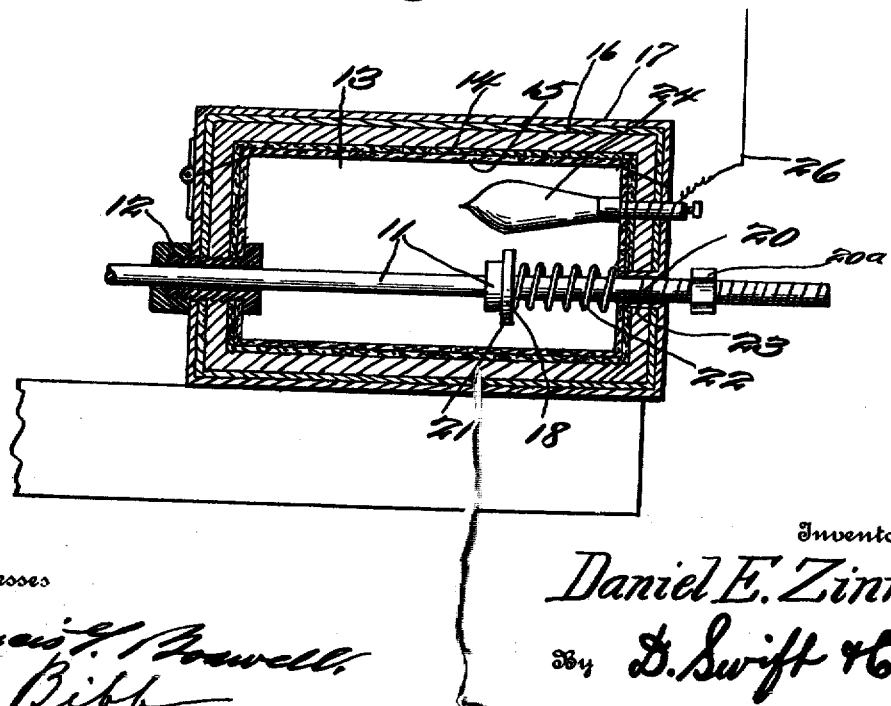
Witnesses
Inventor
Daniel E. Zinn,
By D. Swift & Co.
Attorney

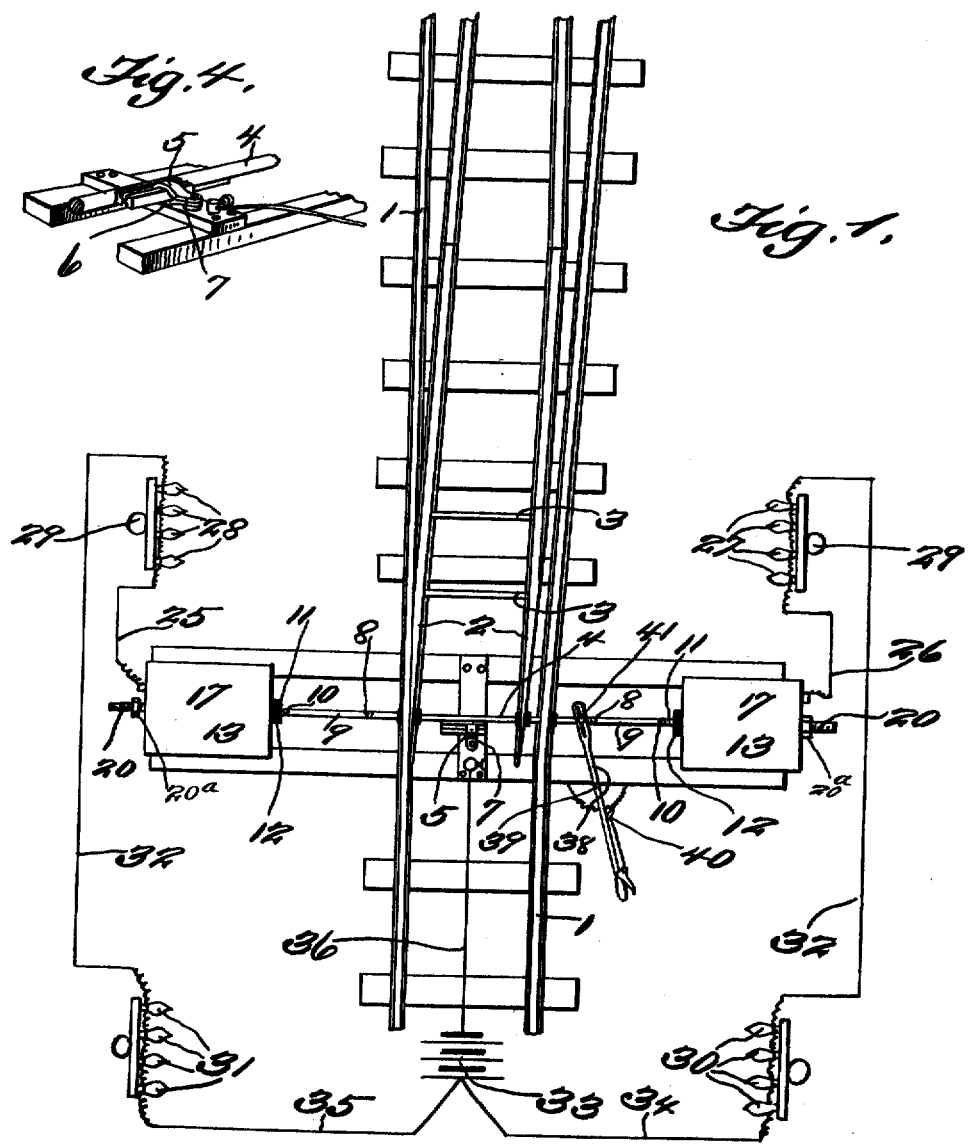

UNITED STATES PATENT OFFICE.

DANIEL E. ZINN, OF WEST WINFIELD, PENNSYLVANIA.

ELECTRIC SIGNAL.

1,004,518. Specification of Letters Patent. Patented Sept. 26, 1911.

Application filed December 19, 1910. Serial No. 598,116.

*To all whom it may concern:*

Be it known that I, DANIEL E. ZINN, a citizen of the United States, residing at West Winfield, in the county of Armstrong and State of Pennsylvania, have invented a new and useful Electric Signal; and I do hereby declare the following to be a full, clear, and exact description of the invention, such as will enable others skilled in the art to which it appertains to make and use the same.

This invention relates to the art of railroads and devices and appliances therefor, and it more particularly pertains to a new and useful signal device, especially adapted for use in connection upon railways of mines, whereby a signal may be displayed, for indicating whether or not the switch is open for the siding or closed for straight ahead.

The invention in its broadest scope aims as its essential object, the provision of a shiftable member for alternately contacting with a yieldable contact disposed adjacent each end of the member, and including a single electric circuit and battery, so that a white light upon one side of the road, and a red light upon the other side of the road may be alternately lighted. When the electric circuit is completely out of order so that neither the red nor the white light will be displayed, it will be understood that the switch mechanism is not in the proper operative condition, therefore necessitating the regulation and the adjustment of the electrically connected parts and the switch.

A further feature of the invention is the production of weather proof casings for inclosing the movable and the yieldable contact members, so as to protect the contact members against the weather.

Another feature of the invention is the provision of a stationary holder having yieldable contact parts between which the shiftable member or rod moves. In the drawings, however, there is only disclosed one form of the invention, but in practical fields this form may require alterations, to which the applicant is entitled provided the alterations are comprehended by the appended claims.

The invention comprises further features and combination of parts, hereinafter set forth, shown in the drawings and claimed.

In the drawings:—Figure 1 is a plan view of the portion of a railroad, including the switch mechanism and the signal apparatus, thus disclosing the features of the invention. Fig. 2 is a diagrammatic view illustrating the electric circuit with the switch points thrown in a different position from that shown in Fig. 1, and illustrating some of the parts of the apparatus in perspective. Fig. 3 is a transverse sectional view on line 3—3 of Fig. 1 illustrating the weather proof casings for inclosing the movable and yieldable contacts. Fig. 4 is a perspective view of the holder and its yieldable contact parts for the shiftable member or rod.

Attention is directed to the annexed drawings, in which is disclosed the preferred form of the invention, it being understood that this signal apparatus is equally as well adapted, for railroads, other than railroads of mines. In the drawings, 1 designates the main rails of the railroad while 2 denotes the switch points. In observing the drawings it will be seen that the switch points are connected as shown at 3, so as to cause them to move together, and in addition to the connection 3 the switch points are connected by a rod 4, which is movable between yieldable parts 5 and 6, of the holder or member 7. Connected to each end of the shiftable rod 4, by means of the pivotal connections 8 are the rods 9, which in turn are pivoted, as at 10, to the movable contacts 11. These movable contacts 11, when the shiftable rod 4 is shifted, reciprocate through the insulated bearings 12 of the weather proof casings 13. The insulated bearings may be made of fiber or any other suitable material and the casings are constructed of wood or other similar material with interior linings of felt and asbestos 14 and 15 for retaining the heat therein, while the exteriors of the casings are covered with tar paper and tin 16 and 17. The tar paper and tin are designed for the purpose of keeping the dampness from the interior of the casings, while the asbestos and felt are for the purpose of retaining the heat within the casings. A certain amount of heat is generated within the casings by means of an electric bulb therein, which is lighted when the movable and yieldable contacts are brought together.

The yieldable contacts 18 and 19 consist of short rods 20 including the contact points or plates 21, there being springs 22 interposed between the plates and the casings and about the said rods 20, for holding the plates approximately in a central position of the casings the short rods 20 move through bearing sleeves 23 of the metal covering of the casings.

Arranged upon the interior of the casings are the electric bulbs 24, which electrically connect with the metal casing or covering of the casings, and connected to the bulbs 24 are the wires 25 and 26, as shown in Figs. 1 and 2. The wires 25 and 26 connect with the electric bulbs 27 and 28, which are mounted upon the poles 29. Connecting between the bulbs 27 and 28 and the bulbs 30 and 31 are the wires 32, while connected between the bulbs 30 and 31 and the battery or other electric generated current 33 are the wires 34 and 35. Between the battery or other generated current 33 and the yieldable parts or contacts of the holder or member 7, is the wire 36. The wiring as above set forth is utilized for completing an electric circuit, when the shiftable rod 4 is moved laterally in one position or another.

When the shiftable rod is in position as shown in Fig. 1, the switch points are thrown for the siding, and when the switch points are in such positions, an electric circuit is closed over one of the wires 32, the wire 35, the battery 33, and the wire 36, as follows: When the rod 4 is in the position shown in Fig. 1 current leaves the battery 33 over the wire 35, through the terminals of the bulbs 31 over the wire 32, to the yieldable contact 21, by way of the bulbs 24 and 28 and the casing of the bulb 24. The electric bulbs 28 and 31 constitute means for indicating that the switch points are thrown for the siding. From the yieldable contact 21 it passes over the rods 9 and 4 to the yieldable parts or contacts 5 and 6 of the holder or member 7, back to the battery 33 over the wire 36. It is to be observed that the rod 9 in completing this circuit does not transfer any current to the casing of the yieldable contact 21, because of its insulated bearing 12. It will be further observed that the current or circuit through the wire 32, the bulb 30, the wire 34 and the battery 33 is broken, there being no way for completing this circuit while the other circuit above set forth is closed, because of the insulated bearing 12 of the contact member 11 (which coöperates with the yieldable contact 20). When the circuit over the wire 35 is closed as above set forth the red electric bulbs 28 and 31 are lighted, thus indicating that the switch points are thrown for the siding. However, when the shiftable rod 4 is thrown in its reversed position as shown in Fig. 2, the white electric light bulbs 27 and 30 are illuminated, current leaving the battery 33 over the wire 34 through the bulbs 30 to the yieldable contact 21 by way of the wire 32 the bulbs 27 and the wire 25. At this point the current passes from the said yieldable contact to the contact 11 back to the battery 33, by virtue of the rods 9 and 4 and the wire 36. When a circuit is completed with the shiftable rod in the position as shown in Fig. 2, the same conditions exist, as when a circuit is closed over the wire 35 through the bulbs 28 and 31, in order to prevent short circuiting.

When the parts of the apparatus are arranged as shown in Fig. 2, the electric light bulbs 27 and 30 (which present a white light), indicate that the switch points are thrown for straight ahead.

There is provided a lever 38 fulcrumed at 39 and including means 40 for holding it in adjusted positions, whereby the shiftable rod 4 may be shifted by virtue of the slot and pin connections 41 between the lever and the rod 4.

The short rods 20 of the yieldable contact are threaded, and engageable with the threads thereof are the nuts 20$^a$, which not only constitute means for limiting the inward throw of the yieldable contacts, but also act for adjusting the rods in their proper position.

The invention having been set forth, what is claimed as new and useful is:—

1. In combination, a pair of switch points having a rod connecting between them and movable therewith, a plate arranged between the switch points and provided with a contact clip member, the rod having a member slidable in the clip member, thus constituting a sliding contact, housed yieldable contacts, a battery having one terminal in circuit with the plate, while the other terminal thereof has separate electric circuit connections with each of the housed yieldable contacts, each of the last circuits including electric light bulbs, and additional rods having connections with the first rod, and constituting movable contacts to coöperate with first one and then the other of the yieldable contacts, whereby one or the other of the circuits may be closed to light the bulbs so as to indicate the positions of the switch points.

2. In combination, a pair of switch points having a connecting rod therebetween, and movable therewith, a plate disposed between the switch points, the rod having a contact connection with the plate, yieldable contacts, a battery having one terminal in circuit with the plate, while the other terminal thereof has separate electric circuit connections with each of the yieldable contacts, each of the last circuits connections including electric light bulbs, and additional rods having connections with the first rod, and constituting movable contacts to coöperate with first one and then the other of the yieldable contacts, whereby one or the other of the circuits may be closed, to light the bulbs so as to indicate the positions of the switch points, and means adjustably threaded on the yieldable contacts for adjusting them in position.

In testimony whereof I have signed my name to this specification in the presence of two subscribing witnesses.

DANIEL E. ZINN.

Witnesses:
S. F. CLARK,
J. M. SHIELDS.

Copies of this patent may be obtained for five cents each, by addressing the "Commissioner of Patents, Washington, D. C."